United States Patent Office 3,716,565
Patented Feb. 13, 1973

3,716,565
3,4-ALLENIC FATTY ACID ESTERS
Clive A. Henrick and John B. Siddall, Palo Alto, Calif., assignors to Zoecon Corporation, Palo Alto, Calif.
No Drawing. Filed Feb. 1, 1971, Ser. No. 111,768
Int. Cl. C07c *69/52, 103/56, 33/04*
U.S. Cl. 260—410.9 R            13 Claims

ABSTRACT OF THE DISCLOSURE

Preparation of di-unsaturated and tri-unsaturated aliphatic esters and amides by reaction of alkynyl alcohol with orthoester or amide ketal to prepare allenic ester or amide and rearrangement of allene, useful for insect control.

---

This invention relates to a process for the preparation of polyolefinic aliphatic esters and amides of Formula A and novel intermediates therefor. More particularly, the present invention provides a method for the preparation of a compound of Formula A

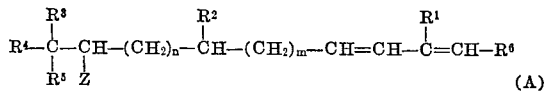
(A)

which comprises reacting an aldehyde of Formula I

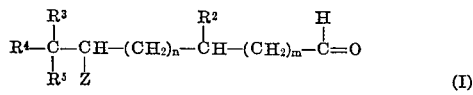
(I)

with an alkynylide of Formula II $$R^1\!\!-\!\!C\!\equiv\!C\!-\!R^{10}$$     (II)

to prepare an alkynyl alcohol of Formula III

(III)

which is reacted with trialkylorthoester or amide ketal to prepare an allene of Formula IV

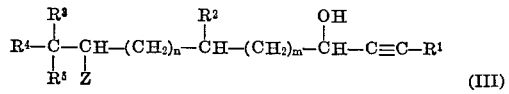
(IV)

which is rearranged by treatment with base to prepare a compound of Formula A.

In the above formulas and hereinafter, $R^1$ is hydrogen or lower alkyl;
each of $R^2$ and $R^3$ is lower alkyl;
$R^4$ is alkyl;
Z is hydrogen;
$R^5$ is hydrogen, lower alkyl, or taken together with Z a carbon-carbon bond;
$m$ is zero or the positive integer one, two or three;
$n$ is the positive integer one, two or three; and
$R^6$ is one of the groups

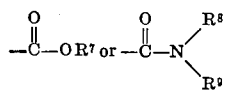

in which $R^7$ is lower alkyl and each of $R^8$ and $R^9$ is hydrogen or lower alkyl and $R^{10}$ is a metal such as lithium, sodium, potassium or magnesium.

In the practice of the above outlined process, an aldehyde of Formula I is reacted with an alkynylide of Formula II to produce the alkynyl alcohol of Formula III. The reaction is carried out in an organic solvent such as the ethers or the hydrocarbons or in liquid ammonia and is generally done at about —78° to room temperature.

See Kimel et al. J. Org. Chem 22, 1611 (1957). An alkynyl alcohol of Formula III is then reacted with trialkyl orthoester such as triethyl orthoacetate or trimethylorthoacetate or with an amide ketal such as N,N-dimethylacetamide, N,N-diethylacetamide, N-ethylacetamide or N-methylacetamide to produce an allenic ester or allenic amide of Formula IV. An allene of Formula IV is then rearranged by treatment with base to an $\alpha,\beta$-unsaturated ester or amide of Formula A.

The aldehydes of Formula I wherein $R^5$ is lower alkyl can be prepared by oxidation of the corresponding primary alcohol using chromic acid, manganese dioxide, or the like. The primary alcohols are described in copending application Ser. No. 879,620, filed Nov. 24, 1969 now abandoned, the disclosure of which is incorporated by reference. The aldehydes of Formula I wherein $R^5$ is hydrogen, can be prepared by oxidation of the corresponding primary alcohol or by hydrogenation of a primary alcohol. The unsaturated aldehydes of Formula I, i.e., $R^5$ taken together with Z is a carbon-carbon bond, can be prepared as described in our copending application Ser. No. 111,766, filed on evendate, now abandoned. For the syntheses of aldehydes, see Sisti et al. J. Org. Chem. 27, 279 (1962), Piacenti; Gazz, Chem. Ital. 92, 225 (1962), Burgstchler, J. Org. Chem 28(10), 2918 (1963), Johnson et al., J. Chem. Soc., 520 (1964), Naves, Chim. Ind. (Paris), 94(3), 223–24 (1965), Carnduff, Quart, Rev. (London), 20(2), 169–89 (1966), Mahadevan et al., Lipid 1(13), 183 (1966), and U.S. Pats. 3,453,317, 3,493,619, and 3,493,621.

The term "alkyl," as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. When the term "alkyl" is modified by the word "lower," herein, the chain length of the alkyl group is one to six carbon atoms.

The compounds of Formula A are useful for the control of insects. The compounds are applied using either liquid or solid carriers such as water, acetone, cottonseed oil, xylene, mineral oil, silica, talc, natural and synthetic resins and the like. Generally, compositions for application will contain up to about 75% of the active compound and more usually less than 25%, to provide about 0.001 to 25 μg. per insect. Typical insects controlled by the present invention are Diptera such as mosquitos and houseflies, Homoptera such as aphids, Hemiptera such as Pyrrhocoridae and Miridae; Lepidoptera such as Pyralidae and Gelechidae, and Coleoptera such as Tenebrionidae, Chrysomelicae and Dermestidae. For example, *Pyrrhocoris apterus, Lygus hesperus, Galleria mellonella, Plodia interpuctella, Phtorimoea operculella, Tenebrio molitor, Triboleum confusm, Diabrotica duodecimpunctata, Dermestes maculatus, Aedes aegypti* and *Musca domestica*. Without any intention of being bound by theory, the compounds of Formula A are believed to be effective by reason of hormonal action in that unlike conventional insecticides which are effective by reason of causing immediate death, the compounds of Formula A are effective by reason of physiological changes caused in the treated insect which affect reproduction by reason of sterility or abnormal development.

The following examples are provided to illustrate the practice of the present invention. Temperature is given in degrees centigrade.

EXAMPLE 1

(A) To magnesium propynylide (15 g.) in 150 ml. of ether is slowly added 0.3 mole of 3,7-dimethyloct-6-en-1-al at 0° and the mixture then stirred overnight. Saturated aqueous ammonium chloride is added and the layers separated. The organic phase, combined with ether backwashings of aqueous phase, is washed with water, dried and solvent evaporated to yield 6,10-dimethyl-9-undecen-2-yn-4-ol which can be purified by chromatography.

(B) A mixture of 18.5 g. of the alkynyl alcohol of part A, 80 g. of triethylorthoacetate and 0.7 g. of propionic acid is refluxed under a spinning band column to remove ethanol as it is formed. After the elimination of ethanol is about complete, the crude reaction product is distilled under vacuum to yield ethyl 3,7,11-trimethyldodeca-3,4,10-trienoate. Alternatively, the crude reaction product is purified by chromatography on silica.

(C) A solution of 1.0 g. of the allenic ester of part B in 20 ml. of ethanol is treated with 4 ml. of aqueous 2 N sodium hydroxide and left at room temperature for several minutes. The mixture is then poured into pentane and washed with saturated brine and separated. Evaporation of the organic phase yields ethyl 3,7,11-trimethyldodeca-2,4,10-trienoate.

EXAMPLE 2

The process of Example 1, part A, is repeated using each of the aldehydes under column I as the starting material to yield the respective alkynyl alcohol under column II, each of which is reacted with triethylorthoacetate using the process of Example 1, part B, to prepare the respective allenic ester under column III.

(I)

3,7-dimethylnon-6-en-1-al
3-methyl-7-ethylnon-6-en-1-al
3,7-diethylnon-6-en-1-al
4,8-dimethylnon-7-en-1-al
3,6-dimethylhept-5-en-1-al
3,6-dimethyloct-5-en-1-al
2,6-dimethylhept-5-en-1-al (II)

6,10-dimethyl-9-dodecen-2-yn-4-ol
6-methyl-10-ethyl-9-dodecen-2-yn-4-ol
6,10-diethyl-9-dodecen-2-yn-4-ol
7,11-dimethyl-10-dodecen-2-yn-4-ol
6,9-dimethyl-8-decen-2-yn-4-ol
6,9-dimethyl-8-undecen-2-yn-4-ol
5,9-dimethyl-8-decen-2-yn-4-ol (III)

ethyl 3,7,11-trimethyltrideca-3,4,10-trienoate
ethyl 3,11-dimethyl-7-ethyltrideca-3,4,10-trienoate
ethyl 3-methyl-7,11-diethyltrideca-3,4,10-trienoate
ethyl 3,8,12-trimethyltrideca-3,4,11-trienoate
ethyl 3,7,10-trimethylundeca-3,4,9-trienoate
ethyl 3,7,10-trimethyldodeca-3,4,9-trienoate
ethyl 3,6,10-trimethylundeca-3,4,9-trienoate Using the process of Example 1, part C, each of the allenic esters under column III is rearranged by treatment with aqueous sodium hydroxide to produce the respective α,β-unsaturated ester.

EXAMPLE 3

Following the process of part A of Example 1, magnesium acetylide is reacted with 3,7-dimethyloct-6-en-1-al as well as each of the aldehydes under column I to produce the respective alkynyl alcohol under column IV.

(IV)

5,9-dimethyl-8-decen-1-yn-3-ol
5,9-dimethyl-8-undecen-1-yn-3-ol
5-methyl-9-ethyl-8-undecen-1-yn-3-ol
5,9-diethyl-8-undecen-1-yn-3-ol
6,10-dimethyl-9-undecen-1-yn-3-1
5,8-dimethyl-7-nonen-1-yn-3-ol
5,8-dimethyl-7-decen-1-yn-3-ol
4,8-dimethyl-7-nonen-1-yn-3-ol Each of the alkynyl alcohols under column IV is reacted with triethylorthoacetate using the procedure of Example 1, part B, to prepare the respective allenic ester under column V.

(V)

ethyl 7,11-dimethyldodeca-3,4,10-trienoate
ethyl 7,11-dimethyltrideca-3,4,10-trienoate
ethyl 7-ethyl-11-methyltrideca-3,4,10-trienoate
ethyl 7,11-diethyltrideca-3,4,10-trienoate
ethyl 8,12-dimethyltrideca-3,4,11-trienoate
ethyl 7,10-dimethylundeca-3,4,9-trienoate
ethyl 7,10-dimethyldodeca-3,4,9-trienoate
ethyl 6,10-dimethylundeca-3,4,9-trienoate Each of the allenic esters under column V is rearranged by treatment with aqueous sodium hydroxide to prepare the respective α,β-unsaturated ester.

EXAMPLE 4

(A) To magnesium propynylide (15 g.) in 150 ml. of ether is slowly added 0.3 mole of 3,7-dimethyl-1-octanal and the mixture stirred overnight at 0°. Saturated aqueous ammonium chloride is added and the layers separated. The organic phase, combined with ether backwashings of aqueous phase, is washed with water, dried and solvent evaporated to yield 6,10-dimethylundec-2-yn-4-ol which can be purified by distillation or chromatography.

(B) A mixture of 18.5 g. of 6,10-dimethylundec-2-yn-4-ol, 80 g. of triethylorthoacetate and 0.75 g. of propionic acid is refluxed under a spinning band column to remove ethanol as it is formed. After the elimination of ethanol is about complete, the crude reaction product is distilled under vacuum to yield ethyl 3,7,11-trimethyldodeca-3,4-dienoate. Alternatively, the crude reaction product is purified by chromatography on silica.

(C) A solution of 1.0 g. of the allenic ester of part B in 20 ml. of ethanol is treated with 4 ml. of aqueous 2 N sodium hydroxide and left at room temperature for several minutes. The mixture is then poured into pentane and washed with saturated brine and separated. Evaporation of the organic phase yields ethyl 3,7,11-trimethyldodeca-2,4-dienoate.

By using N,N-dimethylacetamide dimethylacetal in part B above in place of triethylorthoacetate, there is prepared N,N-dimethyl 3,7,11-trimethyldodeca-3,4-dienamide which is rearranged according to part (C) above to prepare N,N-dimethyl 3,7,11-trimethyldodeca-2,4-dienamide. This reaction is done in toluene at reflux and in the absence of propionic acid.

EXAMPLE 5

The process of part A of Example 4 is repeated using each of the aldehydes under column VI to produce the respective alkynyl alcohol under column VII.

(VI)

3,7-dimethylnonan-1-al
3,7,7-trimethyloctan-1-al
3,7,7-trimethylnonan-1-al
2,5-dimethylhexan-1-al
3,6-dimethylheptan-1-al (VII)

6,19-dimethyldodec-2-yn-4-ol
6,10,10-trimethylundec-2-yn-4-ol
6,10,10-trimethyldodec-2-yn-4-ol
5,8-dimethylnon-2-yn-4-ol
6,9-dimethyldec-2-yn-4-ol The alkynyl alcohols under column VII are reacted with triethyloracetate to produce the respective allenic ester under column VIII which are rearranged to produce the respective α,β-unsaturated esters.

(VIII)

ethyl 3,7,11-trimethyltrideca-3,4-dienoate
ethyl 3,7,11-tetramethyldodeca-3,4-dienoate
ethyl 3,7,11,11-tetramethyltrideca-3,4-dienoate
ethyl 3,6,9-trimethyldeca-3,4-dienoate
ethyl 3,7,10-trimethylundeca-3,4-dienoate

EXAMPLE 6

Following procedure of Example 4 (A) sodium acetylide is reacted with 3,7-dimethyl-1-octanal and each of the aldehydes under column VI to produce the respective alkynyl alcohol under column IX.

(IX)

5,9-dimethyldec-1-yn-3-ol
5,9-dimethylundec-1-yn-3-ol
5,9,9-trimethyldec-1-yn-3-ol
5,9,9-trimethylundec-1-yn-3-ol
4,7-dimethyloct-1-yn-3-ol
5,8-dimethylnon-1-yn-3-ol Each of the alkynyl alcohols under column IX is then reacted with triethylorthoacetate to produce the respective allenic ester under column X which arre rearranged to produce the respective 2,4-dienoate.

(X)

ethyl 7,11-dimethyldodeca-3,4-dienoate
ethyl 7,11-dimethyltrideca-3,4-dienoate
ethyl 7,11,11-trimethyldodeca-3,4-dienoate
ethyl 7,11,11-trimethyltrideca-3,4-dienoate
ethyl 6,9-dimethyldeca-3,4-dienoate
ethyl 7,10-dimethylundeca-3,4-dienoate The use of trimethylorthoacetate in the foregoing examples in place of triethylorthoacetate produces the corresponding methyl esters.

EXAMPLE 7

By reacting N,N-diethylacetamide dimethylacetal with 6,10-dimethyl-9-undecen-2-yn-4-ol and each of the alkynyl alcohols under column II, the respective amides under column XI are prepared which can be rearranged to α,β-unsaturated amides by treatment with base.

(XI)

N,N-diethyl 3,7,11-trimethyldodeca-3,4,10-trienamide
N,N-diethyl 3,7,11-trimethyltrideca-3,4,10-trienamide
N,N-diethyl 3,11-dimethyl-7-ethyltrideca-3,4,10-trienamide
N,N-diethyl 3-methyl-7,11-diethyltrideca-3,4,10-trienamide
N,N-diethyl 3,8,12-trimethyltrideca-3,4,11-trienamide
N,N-diethyl 3,7,10-trimethylundeca-3,4,9-trienamide
N,N-diethyl 3,7,10-trimethyldodeca-3,4,9-trienamide
N,N-diethyl-3,6,10-trimethylundeca-3,4,9-trienamide By the use of N,N-dimethylacetamide dimethylacetal, there is prepared the respective N,N-dimethyl amides—i.e., N,N-dimethyl 3,7,11-trimethyldodeca-3,4,10-trienamide, etc.

By reacting N,N-dimethylacetamide dimethylacetal with each of the alkynyl alcohols under column VII, the respective allenic amides under column XII are prepared which are rearranged by treatment with base to the α,β-unsaturated amides.

(XII)

N,N-dimethyl 3,7,11-trimethyltrideca-3,4-dienamide
N,N-dimethyl 3,7,11,11-tetramethyldodeca-3,4-dienamide
N,N-dimethyl 3,7,11,11-tetramethyltrideca-3,4-dienamide
N,N-dimethyl 3,6,9-trimethyldeca-3,4-dienamide
N,N-dimethyl 3,7,10-trimethylundeca-3,4-dienamide N,N-dimethylacetamide dimethylacetal is reacted with 5,9-dimethyldec-1-yn-3-ol to yield N,N-dimethyl 7,11-dimethyldodeca-3,4-dienamide which is rearranged to yield N,N-dimethyl 7,11-dimethyldodeca-2,4-dienamide.

What is claimed is:

1. A compound selected from those of the following Formula IV:

$$R^4-\underset{\underset{Z}{|}}{\overset{\overset{R^3}{|}}{C}}-CH-(CH_2)_n-\overset{\overset{R^2}{|}}{C}H-(CH_2)_m-CH=C=\overset{\overset{R^1}{|}}{C}-CH_2-R^6$$

(IV)

wherein,
$R^1$ is hydrogen or lower alkyl;
each of $R^2$ and $R^3$ is lower alkyl;
$R^4$ is lower alkyl;
Z is hydrogen;
$R^5$ is hydrogen, lower alkyl, or taken together with Z a carbon-carbon bond;
$m$ is zero or the positive integer one or two;
$n$ is the positive integer one or two;
$R^6$ is the group $$-\overset{\overset{O}{\|}}{C}-OR^7$$

in which $R^7$ is lower alkyl.

2. A compound according to claim 1 wherein $R^2$ is methyl or ethyl; $R^3$ is methyl or ethyl; $R^4$ is lower alkyl; and $R^7$ is methyl or ethyl.

3. A compound according to claim 2 wherein $R^1$ is methyl.

4. A compound according to claim 3 wherein $R^5$ is hydrogen, Z is hydrogen, $R^4$ is methyl or ethyl, $m$ is one and $n$ is two.

5. A compound according to claim 4 wherein each of $R^2$, $R^3$ and $R^4$ is methyl.

6. A compound according to claim 3 wherein each of $R^4$ and $R^5$ is methyl or ethyl, Z is hydrogen, $m$ is one and $n$ is two.

7. A compound according to claim 3 wherein each of $R^2$, $R^3$, $R^4$ and $R^5$ is methyl.

8. A compound according to claim 3 wherein $R^5$ taken together with Z is a carbon-carbon bond; $m$ is one; and $n$ is one or two.

9. A compound according to claim 8 wherein $n$ is two.

10. A compound according to claim 8 wherein each of $R^2$ and $R^3$ is methyl.

11. A compound according to claim 9 where each of $R^2$ and $R^3$ is methyl.

12. The compound, ethyl 3,7,11-trimethyldodeca-3,4,10-trienoate, according to claim 11.

13. The compound, ethyl 3,7,11 - trimethyldodeca-3,4-dienoate, according to claim 5.

References Cited

UNITED STATES PATENTS 3,236,869   2/1966   Thompson _____ 260—405.5

OTHER REFERENCES

Chemical Abstracts, vol. 71, 38219-g (1969).

LEWIS GOTTS, Primary Examiner

D. G. RIVERS, Assistant Examiner

U.S. Cl. X.R.

260—404, 601 R, 603 HF, 632 Y, 999